(12) United States Patent
Choochotkaew et al.

(10) Patent No.: US 11,627,112 B2
(45) Date of Patent: Apr. 11, 2023

(54) SOCKET TRANSFERRING FOR HPC NETWORKS USING KERNEL TRACING

(71) Applicant: INTERNATIONAL BUSINESS MACHINES CORPORATION, Armonk, NY (US)

(72) Inventors: Sunyanan Choochotkaew, Koto (JP); Tatsuhiro Chiba, Bunkyo-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 17/400,588

(22) Filed: Aug. 12, 2021

(65) Prior Publication Data
US 2023/0052452 A1 Feb. 16, 2023

(51) Int. Cl.
*H04L 9/40* (2022.01)

(52) U.S. Cl.
CPC ...... *H04L 63/0245* (2013.01); *H04L 63/0236* (2013.01); *H04L 63/1441* (2013.01);
(Continued)

(58) Field of Classification Search
CPC ... H04L 9/40; H04L 63/0227; H04L 63/0236; H04L 63/0245; H04L 63/14; H04L 63/1441; H04L 63/1491
See application file for complete search history.

(56) References Cited

U.S. PATENT DOCUMENTS

| | | |
|---|---|---|
| 10,250,522 B1 | 4/2019 | Anderson |
| 11,070,573 B1 | 7/2021 | Edwards et al. |
| | (Continued) | |

FOREIGN PATENT DOCUMENTS

| | | | | |
|---|---|---|---|---|
| AU | 2014205389 A1 | * | 6/2015 | ......... H04L 63/1425 |
| CN | 101206590 A | | 6/2008 | |
| CN | 10802142 A | | 5/2018 | |

OTHER PUBLICATIONS

IO Visor Project, BCC BPF Compiler Collection, https://www.iovisor.org/technology/bcc, 2016, pp. 1-3.
(Continued)

*Primary Examiner* — Jayesh M Jhaveri
(74) *Attorney, Agent, or Firm* — Tutunjian & Bitetto, P.C.; Randy Emilio Tejeda

(57) ABSTRACT

A computer-implemented method for building socket transferring between containers in cloud-native environments by using kernel tracing techniques is provided including probing a connection-relevant system call event by using an eBPF to collect and filter data at a router, creating a mirror call at a host namespace with a dummy server and dummy client by creating the dummy server with mirror listening parameters, sending a server host address mapping to overlay the server host address to the client coordinator in an overlay process, and creating and connecting the dummy client to return a client host address to the server coordinator. The method further includes transferring mirror connections to the overlay process via a forwarder by temporary namespaces entering and injecting socket system calls and probing a transfer call event to map an overlay socket with a transferred dummy socket to activate duplication when the overlay socket is not locked.

25 Claims, 12 Drawing Sheets

(52) U.S. Cl.
CPC ...... *H04L 63/1491* (2013.01); *H04L 63/0227* (2013.01); *H04L 63/14* (2013.01)

(56) References Cited

U.S. PATENT DOCUMENTS

| | | | |
|---|---|---|---|
| 11,252,011 B2* | 2/2022 | Rao | H04L 43/022 |
| 2017/0199770 A1* | 7/2017 | Peteva | G06F 9/5088 |
| 2019/0098019 A1* | 3/2019 | Coleman | G06F 21/53 |
| 2019/0349305 A1 | 11/2019 | Wang et al. | |
| 2020/0348938 A1* | 11/2020 | Mark | G06F 21/602 |

OTHER PUBLICATIONS

Sasha Goldshtein, BPD Tracing Superpowers, https://s.sashag.net/ops0416, pp. 1-11.

BPF Compiler Collection, https://github.com/iovisor/bcc/blob/master/README.md, Aug. 2020, pp. 1-11.

Guide, Amazon Elastic Compute Cloud User. "Amazon Web Services." Inc. Dec. 2012.

Sabharwal et al., GKE Networking—Pro Google Kubernetes Engine : Network, Security, Monitoring, and Automation Configuration, https://learning.oreilly.com/library/view/pro-google-kubernetes/9781484262436/html/495003_1_En_4_Chapter.xhtml, 2020, pp. 1-16.

GitHub, https://github.com/emptymonkey/ptrace_do/blob/master/README.md, May 2018, pp. 1-4.

Zhuo et al., "Slim: OS Kernel Support for a Low-Overhead Container Overlay Network", Proceedings of the 16th USENIX Symposium on Networked Systems Design and Implementation (NSDI '19), Feb. 2019, pp. 1-15.

Dong et al., "High Performance Network Virtualization with SRIOV", Jan. 2010, pp. 1-10.

* cited by examiner

SOCKET TRANSFERRING FOR HPC NETWORKS USING KERNEL TRACING

BACKGROUND

The present invention relates generally to high performance computing, and more specifically, to methods and systems for socket transferring for high performance computing networks by using kernel tracing.

High performance computing (HPC) plays an important role in scientific investigations and particularly in scenarios where teraflops are needed to solve computational problems. Usually, such investigations have been limited to a relatively small number of research and commercial institutions due to the large capital cost for setting up and maintaining the underlying cyber infrastructure.

SUMMARY

In accordance with an embodiment, a computer-implemented method for building socket transferring between containers in cloud-native environments by using kernel tracing techniques is provided. The computer-implemented method includes probing a connection-relevant system call event by using an extended Berkeley Packet Filter (eBPF) to collect and filter data at a router and handled by server and client coordinators, creating a mirror call at a host namespace with a dummy server and dummy client by: creating the dummy server with mirror listening parameters, sending a server host address mapping to overlay the server host address to the client coordinator in an overlay process, and creating and connecting the dummy client to return a client host address to the server coordinator, transferring mirror connections to the overlay process via a forwarder by temporary namespaces entering and injecting socket system calls, and probing a transfer call event to map an overlay socket with a transferred dummy socket to activate duplication when the overlay socket is not locked.

In accordance with another embodiment, a computer program product for building socket transferring between containers in cloud-native environments by using kernel tracing techniques is provided. The computer program product includes a computer readable storage medium having program instructions embodied therewith, the program instructions executable by a computer to cause the computer to probe a connection-relevant system call event by using an extended Berkeley Packet Filter (eBPF) to collect and filter data at a router and handled by server and client coordinators, create a mirror call at a host namespace with a dummy server and dummy client by: creating the dummy server with mirror listening parameters, sending a server host address mapping to overlay the server host address to the client coordinator in an overlay process, and creating and connecting the dummy client to return a client host address to the server coordinator, transfer mirror connections to the overlay process via a forwarder by temporary namespaces entering and injecting socket system calls, and probe a transfer call event to map an overlay socket with a transferred dummy socket to activate duplication when the overlay socket is not locked.

In accordance with yet another embodiment, a system for building socket transferring between containers in cloud-native environments by using kernel tracing techniques is provided. The system includes a server pod implementing a server process and a client pod implementing a client process, wherein system calls are transmitted from the server pod to the client pod to probe a connection-relevant system call event by using an extended Berkeley Packet Filter (eBPF) to collect and filter data at a router and handled by server and client coordinator, create a mirror call at a host namespace with a dummy server and dummy client by: creating the dummy server with mirror listening parameters, sending a server host address mapping to overlay the server host address to the client coordinator in an overlay process, and creating and connecting the dummy client to return a client host address to the server coordinator, transfer mirror connections to the overlay process via a forwarder by temporary namespaces entering and injecting socket system calls, and probe a transfer call event to map an overlay socket with a transferred dummy socket to activate duplication when the overlay socket is not locked.

In accordance with another embodiment, a computer-implemented method for building socket transferring between containers in cloud-native environments by using kernel tracing techniques is provided. The computer-implemented method includes probing a connection-relevant system call event by employing an extended Berkeley Packet Filter (eBPF) using a BPF Compiler Collection (BCC) toolkit for polling listen, accept, and connect system calls from a kernel in real-time to a router, creating a mirror call at a host namespace with a dummy server and a dummy client, transferring mirror connections to an overlay process via a forwarder by: transferring a file descriptor to the forwarder via a Unix socket in the host namespace, temporarily moving a mount namespace, via the forwarder, to the overlay process, injecting a recvmsg system call in place of the overlay process, and sending the file descriptor via the Unix socket to a listening overlay process, and probing a transfer call event to map an overlay socket with a transferred dummy socket to activate duplication when the overlay socket is not locked.

In accordance with yet another embodiment, a computer program product for building socket transferring between containers in cloud-native environments by using kernel tracing techniques is provided. The computer program product includes a computer readable storage medium having program instructions embodied therewith, the program instructions executable by a computer to cause the computer to probe a connection-relevant system call event by employing an extended Berkeley Packet Filter (eBPF) using a BPF Compiler Collection (BCC) toolkit for polling listen, accept, and connect system calls from a kernel in real-time to a router, create a mirror call at a host namespace with a dummy server and a dummy client, transfer mirror connections to an overlay process via a forwarder by: transferring a file descriptor to the forwarder via a Unix socket in the host namespace, temporarily moving a mount namespace, via the forwarder, to the overlay process, injecting a recvmsg system call in place of the overlay process, and sending the file descriptor via the Unix socket to a listening overlay process, and probe a transfer call event to map an overlay socket with a transferred dummy socket to activate duplication when the overlay socket is not locked.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
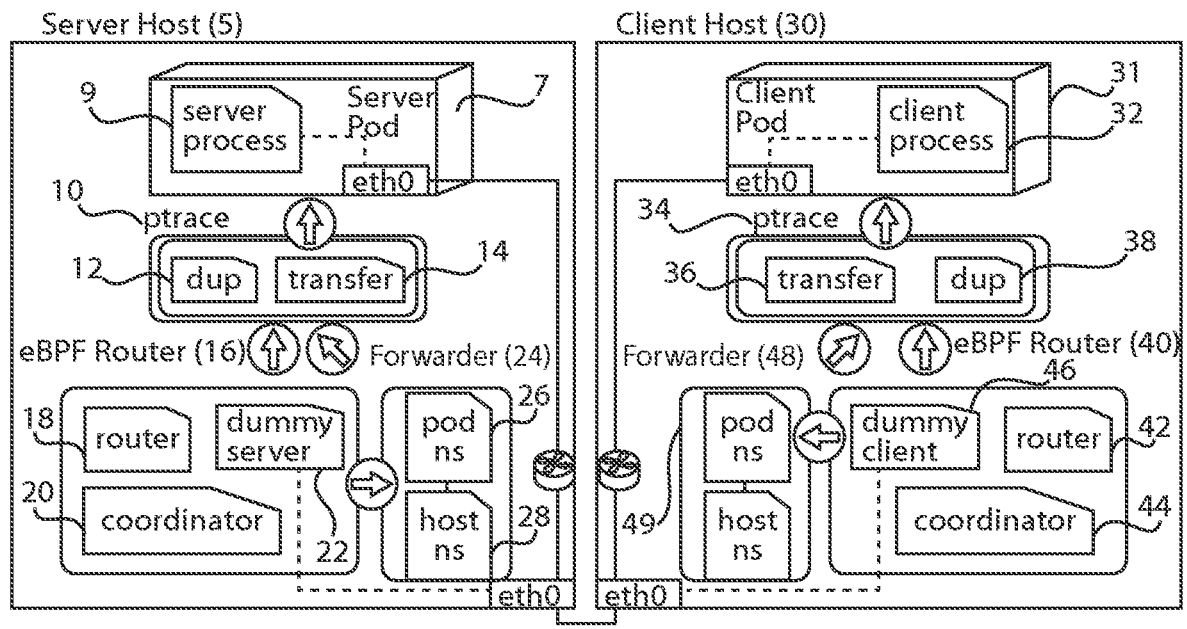
FIG. 1 shows an exemplary high performance computing architecture for employing a socket transferring technique, in accordance with an embodiment of the present invention.

Embodiments in accordance with the present invention provide methods and devices for socket transferring for high performance computing networks by using kernel tracing. High-performance computing (HPC) or cluster computing is increasingly used for a large number of computationally intensive tasks, such as webscale data mining, machine learning, network traffic analysis, and various engineering and scientific tasks. In such systems, jobs may be scheduled to execute concurrently on a computing cluster in which application data is stored on multiple compute nodes. HPC applications require intensive long-term communication processes for completing high computation work in a parallel manner and network performance can become a bottleneck. Network isolation in a cloud environment can the keep an underlying host from the users' containers and increase overall data security.

The exemplary embodiments of the present invention employ socket transferring to bypass overhead of double network interface processing in network isolation by pre-loading the socket library to the transferring socket from another process via a bound Unix socket that is accessible for both sides. The exemplary embodiments of the present invention further employ eBPF, which is an extended use case of BPF (Berkeley Packet Filter) that allow the attachment of a program written in the user namespace to the calls in the kernel namespace, facilitated by BCC (BPF Complier Collection) project. The main issue that the exemplary embodiments address is how to increase network performance while maintaining the cloud-native isolation concept.

BPF is a highly flexible and efficient virtual machine-like construct in the Linux kernel allowing to execute bytecode at various hook points in a safe manner. BPF was used in a number of Linux kernel subsystems, most prominently networking, tracing and security (e.g., sandboxing). The extended Berkeley Packet Filter (eBPF) first appeared in Kernel 3.18 and renders the original version which is being referred to as "classic" BPF (cBPF) these days mostly obsolete. cBPF is known to many as being the packet filter language used by tcpdump. Nowadays, the Linux kernel runs eBPF only and loaded cBPF bytecode is transparently translated into an eBPF representation in the kernel before program execution.

The Linux kernel has always been an ideal place to implement monitoring/observability, networking, and security. Unfortunately this was often impractical as it required changing kernel source code or loading kernel modules, and resulted in layers of abstractions stacked on top of each other. eBPF is a revolutionary technology that can run sandboxed programs in the Linux kernel without changing kernel source code or loading kernel modules.

By making the Linux kernel programmable, infrastructure software can leverage existing layers, making them more intelligent and feature-rich without continuing to add additional layers of complexity to the system or compromising execution efficiency and safety.

eBPF has resulted in the development of a completely new generation of software able to reprogram the behavior of the Linux kernel and even apply logic across multiple subsystems which were traditionally completely independent.

The implementation of eBPF with socket transferring techniques allows the exemplary embodiments of the present invention to increase network performance while maintaining the cloud-native isolation concept. Cloud native is a term used to describe container-based environments. Cloud-native technologies are used to develop applications built with services packaged in containers, deployed as microservices and managed on elastic infrastructure through agile DevOps processes and continuous delivery workflows.

Cloud-native platforms, like Kubernetes, expose a flat network that is overlaid on existing networking topologies and primitives of cloud providers. Similarly, the native storage layer is often abstracted to expose logical volumes that are integrated with containers. Operators can allocate storage quotas and network policies that are accessed by developers and resource administrators. The infrastructure abstraction not only addresses the need for portability across cloud environments, but also lets developers take advantage of emerging patterns to build and deploy applications. Orchestration managers become the deployment target, irrespective of the underlying infrastructure that may be based on physical servers or virtual machines, private clouds or public clouds.

Kubernetes is an ideal platform for running contemporary workloads designed as cloud-native applications. It's become the de facto operating system for the cloud, in much the same way Linux is the operating system for the underlying machines. The exemplary embodiments of the present invention can be applied to Kubernetes environments.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 shows an exemplary high performance computing (HPC) architecture for employing a socket transferring technique, in accordance with an embodiment of the present invention.

To better understand the socket transferring techniques of the exemplary embodiments of the present invention that are implemented in cloud-native applications, certain concepts are laid out in detail to integrate or interrelate such components.

Figure 6:
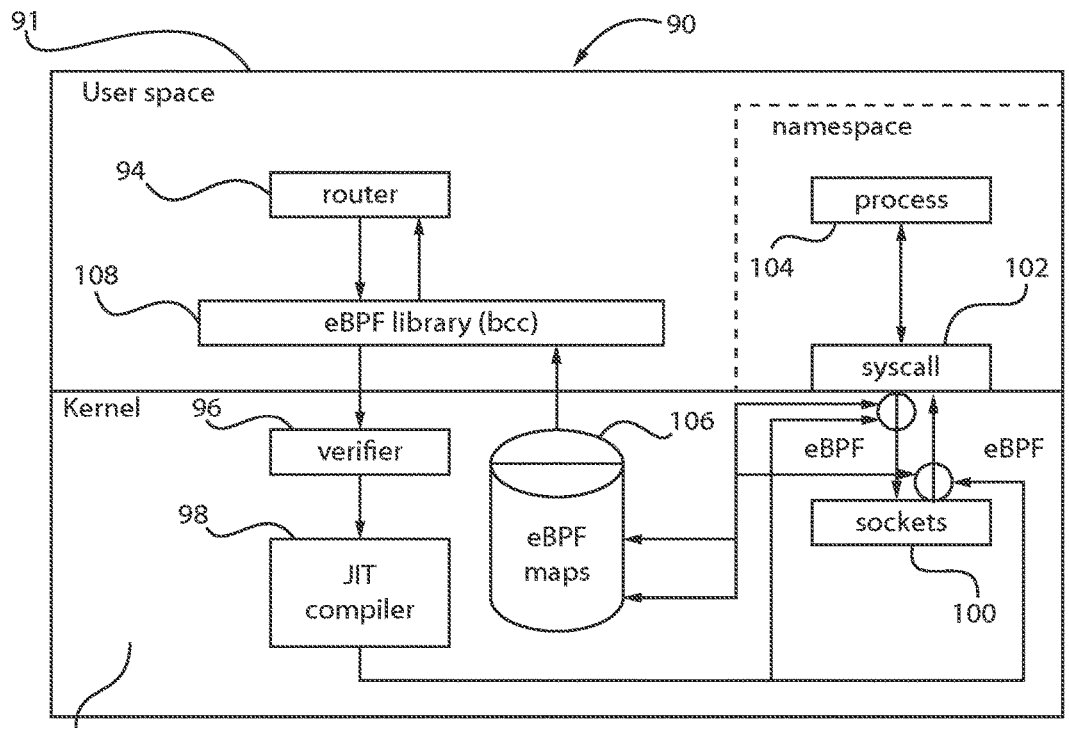
FIG. 6 is a block/flow diagram of an exemplary eBPF, which is an extended use case of the Berkeley Packet Filter (BPF), in accordance with an embodiment of the present invention.

In particular, Linux divides its memory into two distinct areas, that is, kernel space and user space, as further shown in FIG. 6. Kernel space is where the core of the operating system (OS) resides. Kernel space has full and unrestricted access to all hardware, such as memory, storage, central processing unit (CPU), etc. Due to the privileged nature of kernel access, kernel space is protected and allows to run only the most trusted code, which includes the kernel itself and various device drivers.

User space is where anything that is not a kernel process runs, e.g., regular applications. User space code has limited access to hardware and relies on code running in kernel space for privileged operations such as disk or network input/output (I/O). For example, to send a network packet, a user space application must talk to the kernel space network card driver via a kernel application programming interface (API) referred to as "system calls." Thus, a system call is an interface between a user-space application and a service that the kernel provides.

While the system call interface is sufficient in most cases, developers may need more flexibility to add support for new hardware, implement new filesystems, or even custom system calls. For this to be possible, there must be a way for programmers to extend the base kernel without adding directly to the kernel source code. Linux Kernel Modules (LKMs) serve this function. Unlike system calls, where requests traverse from user space to kernel space, LKMs are loaded directly into the kernel. One feature of LKMs is that they can be loaded at runtime, removing the need to recompile the entire kernel and reboot the machine each time a new kernel module is required.

As helpful as LKMs are, LKMs introduce certain risks to the system. Indeed, the separation between kernel and user spaces adds a number of important security measures to the OS. The kernel space is meant to run only a privileged OS kernel, with the intermediate layer, separating user space programs and preventing them from interfering with finely tuned hardware. In other words, LKMs can make the kernel crash.

To alleviate such issues, the extended Berkeley Packet Filter (eBPF) was created. eBPF is a mechanism for writing code to be executed in the Linux kernel space that has already been used to create programs for networking, debugging, tracing, firewalls, and more.

Born out of a need for better Linux tracing tools, eBPF drew inspiraton from dtrace, a dynamic tracing tool available primarily for the Solaris and Berkeley Software Distribution (BSD) operating systems. Unlike dtrace, Linux could not get a global overview of running systems, since it was limited to specific frameworks for system calls, library calls, and functions. Building on the BPF, a tool for writing packer-filtering code using in-kernel virtual machines (VM), a group of engineers began to extend the BPF backend to provide a similar set of features as dtrace, thus creating eBPF.

eBPF allows regular user space applications to package the logic to be executed within the Linux kernel as a bytecode. These are called eBPF programs and they are produced by an eBPF compiler toolchain called BCC (BPF Compiler Collection). eBPF programs are invoked by the kernel when certain events, called hooks, happen. Examples of such hooks include system calls, network events, and others.

Before being loaded into the kernel, an eBPF program must pass a certain set of checks. Verification involves executing the eBPF program within a virtual machine via a verifier. The verifier traverses the potential paths the eBPF program may take when executed in the kernel, making sure the program does indeed run to completion without any looping, which would cause a kernel lockup. Other checks, from valid register state and program size to out of bound jumps, are also carried through. From the outset, eBPF sets itself apart from LKMs with important safety controls in place. Only if all checks pass, the eBPF program is loaded and compiled into the kernel and starts waiting for the right hook. Once triggered, the bytecode executes.

The end result is that eBPF lets programmers safely execute custom bytecode within the Linux kernel without modifying or adding to kernel source code.

The exemplary embodiments of the present invention implement the eBPF with socket transferring techniques. The socket API is an Interprocessing Communication (IPC) programming interface originally provided as part of the Berkeley UNIX operating system.

Sockets are commonly used for client and server interaction. Typical system configuration places the server on one machine, with the clients on other machines. The clients connect to the server, exchange information, and then disconnect.

A socket has a common flow of events. In a connection-oriented client-to-server model, the socket on the server process waits for requests from a client. To do this, the server first establishes (binds) an address that clients can use to find the server. When the address is established, the server waits for clients to request a service. The client-to-server data exchange takes place when a client connects to the server through a socket. The server performs the client's request and sends the reply back to the client, as described in FIG. 8 below.

With this is mind, referring back to FIG. 1, a server host 5 includes a server pod 7. The server pod 7 runs a server process 9. An eBPF router 16 communicates with the server pod 7 via a system call referred to as ptrace 10. The ptrace( ) system call provides a means by which one process (the "tracer") may observe and control the execution of another process (the "tracee"), and examine and change the tracee's memory and registers. ptrace( ) system call is primarily used to implement breakpoint debugging and system call tracing. Ptrace 10 includes a duplicate parameter 12 and a transfer parameter 14.

The eBPF router 16 has a router 18, a coordinator 20, and a dummy server 22. The eBPF router 16 communicates with a forwarder 24 having a pod ns 26 and a host ns 28.

The server host 5 runs one or more server programs, which share their resources with client host 30. The client host 30 does not share any of its resources, but it requests content or service from the server host 5. The client host 30, therefore, initiates communication sessions with the server host 5, which awaits incoming requests.

The client host 30 includes a client pod 31. The client pod 31 runs a client process 32. An eBPF router 40 communicates with the client pod 31 via a system call referred to as ptrace 34. The ptrace( ) system call provides a means by which one process (the "tracer") may observe and control the execution of another process (the "tracee"), and examine and change the tracee's memory and registers. ptrace( ) system call is primarily used to implement breakpoint debugging and system call tracing. Ptrace 34 includes a duplicate parameter 38 and a transfer parameter 36.

The eBPF router 40 has a router 42, a coordinator 44, and a dummy client 46. The eBPF router 40 communicates with a forwarder 48 having a pod ns and a host ns, collectively designated as 49.

Therefore, the eBPF router 16 can use ptrace 10 to inspect and manipulate the internal state of the server pod 7, whereas eBPF router 40 can use ptrace 34 to inspect and manipulate the internal state of the client pod 31.

Referring to FIG. 1, the exemplary methods probe connection-relevant system call events using eBPF routers 16, 40 for collection and filtering, and are handled by respective coordinators 20, 44. The exemplary methods then create a mirror call at the host namespace with dummy server/client 22, 46 by creating the dummy server 22, sending the server host address mapping to overlay the address to the coordinator 44 of client host 30, creating and connecting the dummy client 46, and returning the client host address to server coordinator 44. The exemplary methods further transfer the mirror connection to the overlay process via the forwarder 24 by temporary namespace entering and injecting the system call. Finally, the exemplary embodiments probe transfer the call event to map the overlay socket with a transferred dummy socket and activate duplication when the overlay socket is not locked.

As a result, an approach to transfer a socket connection from the parent network namespace to an isolated, overlay child namespace can be performed by using eBPF tracing to passively poll and filter the socket system call in the overlay process and by injecting a file descriptor passing call into the overlay process and by using a middle process to move between child and parent namespaces for transferring the parent socket connection.

Figure 2:
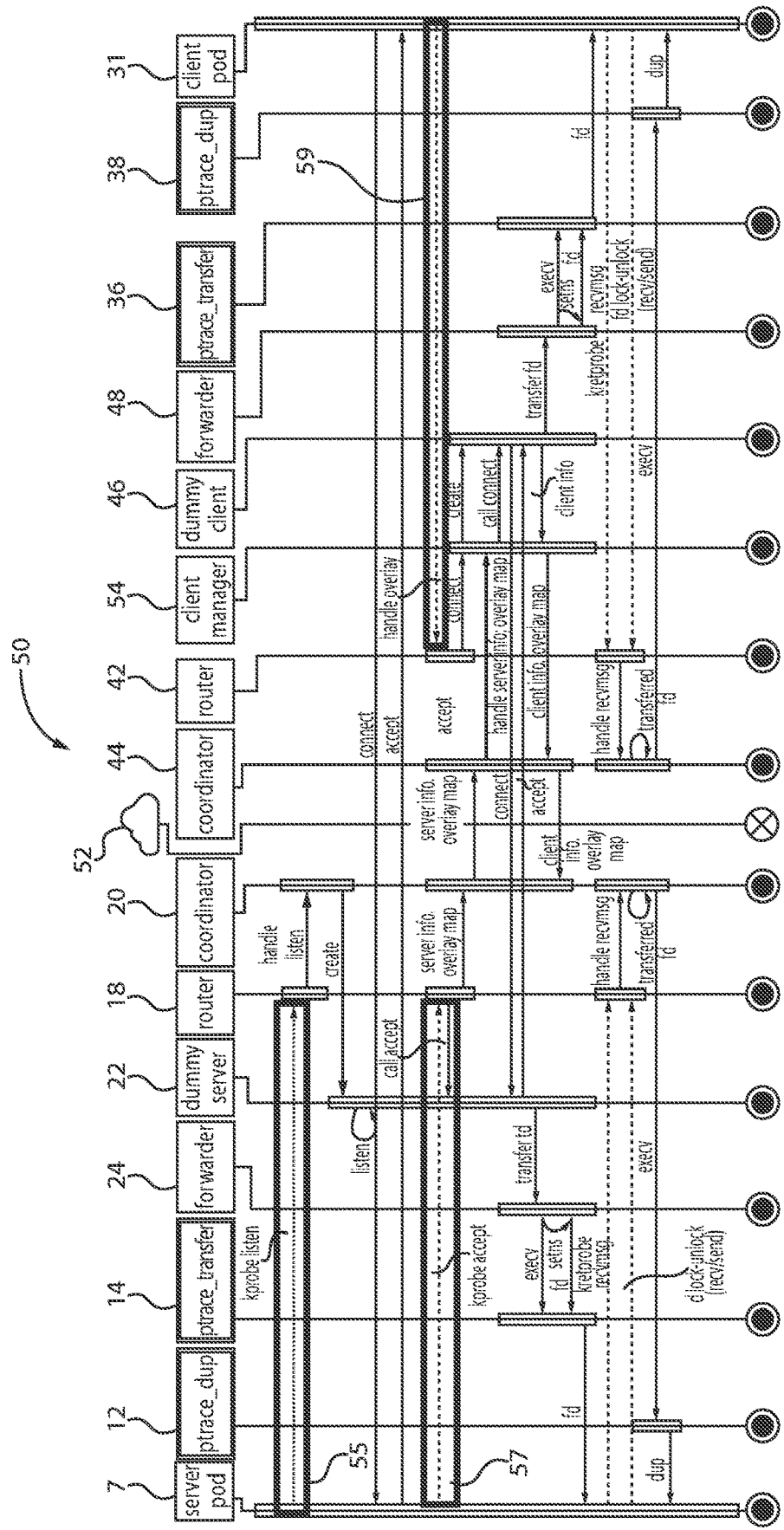
FIG. 2 illustrates communications involving connection-relevant system call events, in accordance with an embodiment of the present invention.

FIG. 2 illustrates communications 50 involving connection-relevant system call events, in accordance with an embodiment of the present invention.

Initially, the exemplary methods probe connection-relevant system call events. Such events can be, e.g., listen, accept, and connect events. In particular, the exemplary methods use a BPF Compiler Collection (BCC) toolkit for polling listen, accept, and connect system calls from the kernel in real-time to the router program. The events are handled as follows. Regarding the listen event, a dummy server is created and keep listening. Regarding the accept event, get ready to accept a new connection and cooperate with the accepted client via coordinators. Regarding the connect event, get ready to make a connection with the host layer once it gets information from the server host.

On the server host 5, the listen event 55 is transmitted from server pod 7 to the router 18 of the eBPF router 16. The coordinator 20 will handle the listen event 55. The accept event 57 is transmitted from the server pod 7 to the router 18 of the eBPF router 16. The server info and overlay map are transmitted to the coordinator 20.

On the client host 30, the client pod 31 transmits a connect event 59 to the router 42 of the eBPF 40. A connection can be made between the server host 5 and the client host 30 via the network 52, as well as the client manager 54.

Figure 3:
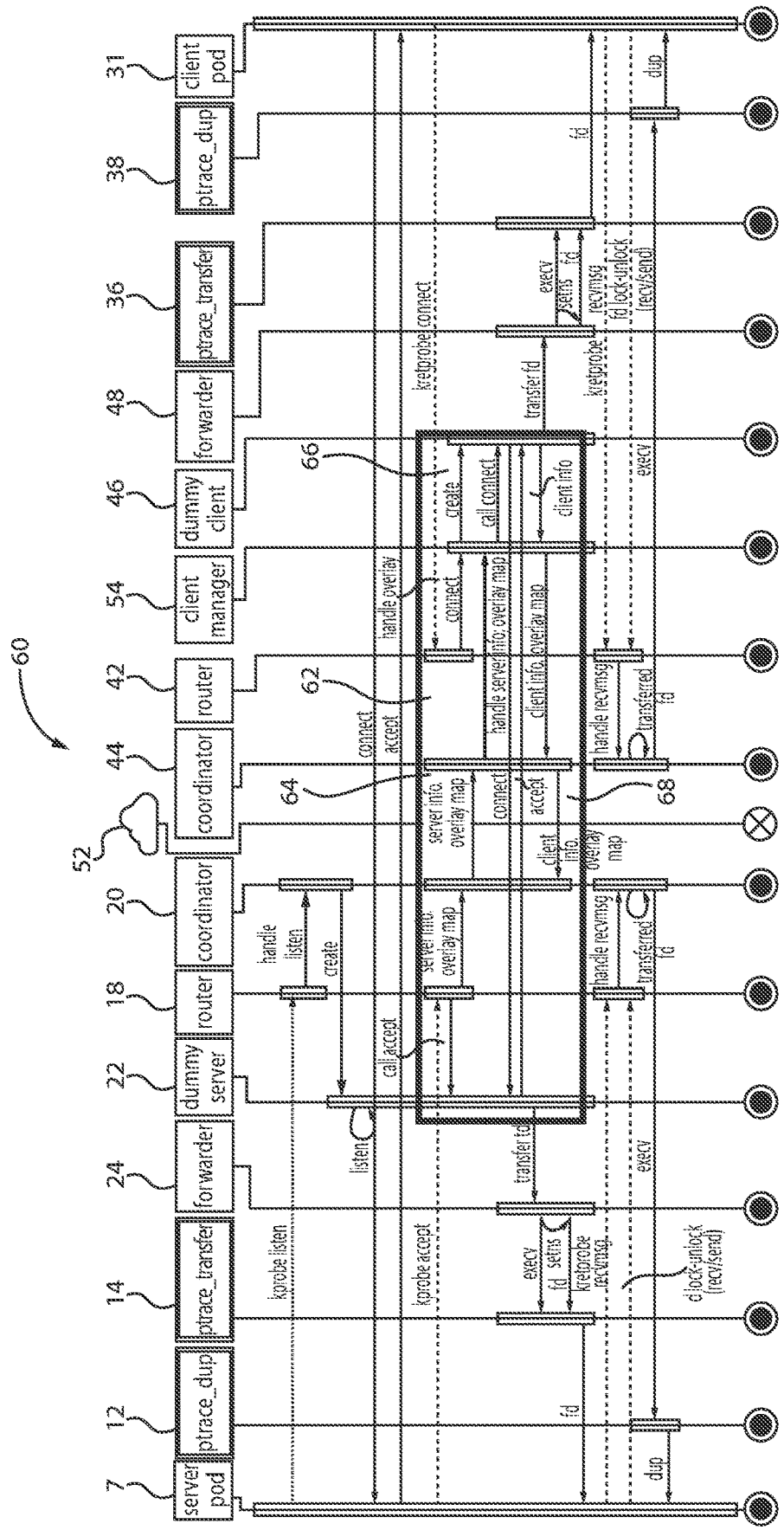
FIG. 3 illustrates communications involving creating mirror connections at the host network namespace, in accordance with an embodiment of the present invention.

FIG. 3 illustrates communications 60 involving creating mirror connections at the host network namespace, in accordance with an embodiment of the present invention.

After the probe connection-relevant system call events have been completed, a mirror connection is created at the host network namespace. In particular, the server coordinator 20 sends the server host address and the mapped overlay src/dst address 64 to the client coordinator 44. The client coordinator 44 allows the mapped dummy client to create a connection 66 to the received server host address. The client coordinator 44 then returns the client host address to the server coordinator 20. The transmittals occur within region 62.

Figure 4:
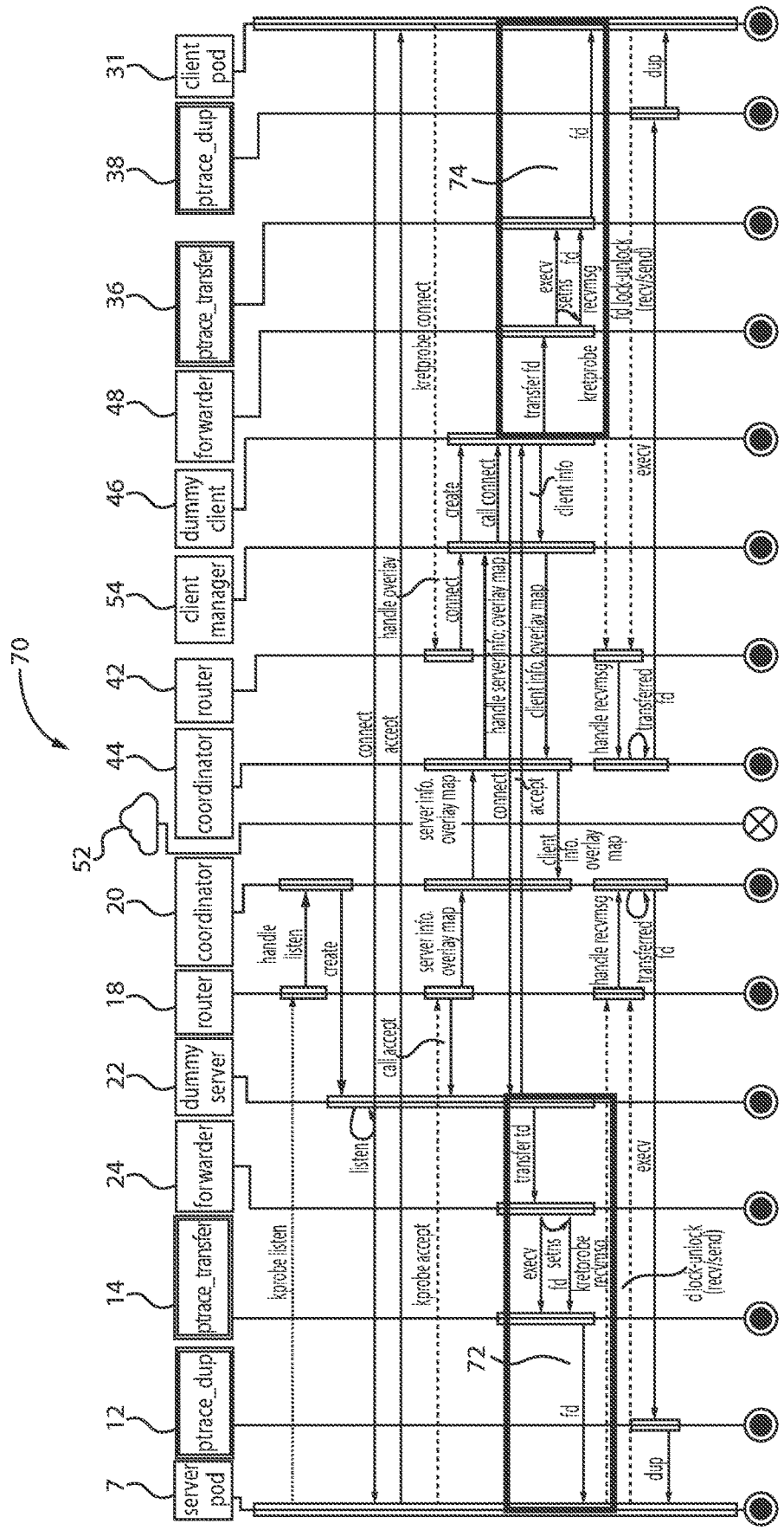
FIG. 4 illustrates communications involving transferring mirror connections to the overlay process, in accordance with an embodiment of the present invention.

FIG. 4 illustrates communications 70 involving transferring mirror connections to the overlay process, in accordance with an embodiment of the present invention.

After the mirror connection is created at the host network namespace, the mirror connection is transferred to the overlay process. In particular, once the host connection of the dummy client/server is established, the file descriptor 72 is transferred to the forwarder process via a Unix socket in the host namespace. The forwarder 24 temporarily moves the mount namespace to the overlay process by a setns system call. The forwarder forks ptrace_transfer, which applies ptrace_do to inject the recvmsg call in place of the overlay process at region 74. The forwarder 48 then sends the file descriptor via the Unix socket to the listening overlay process. Finally, the forwarder 48 gets back to the original mount namespace waiting for next transfer request.

Figure 5:
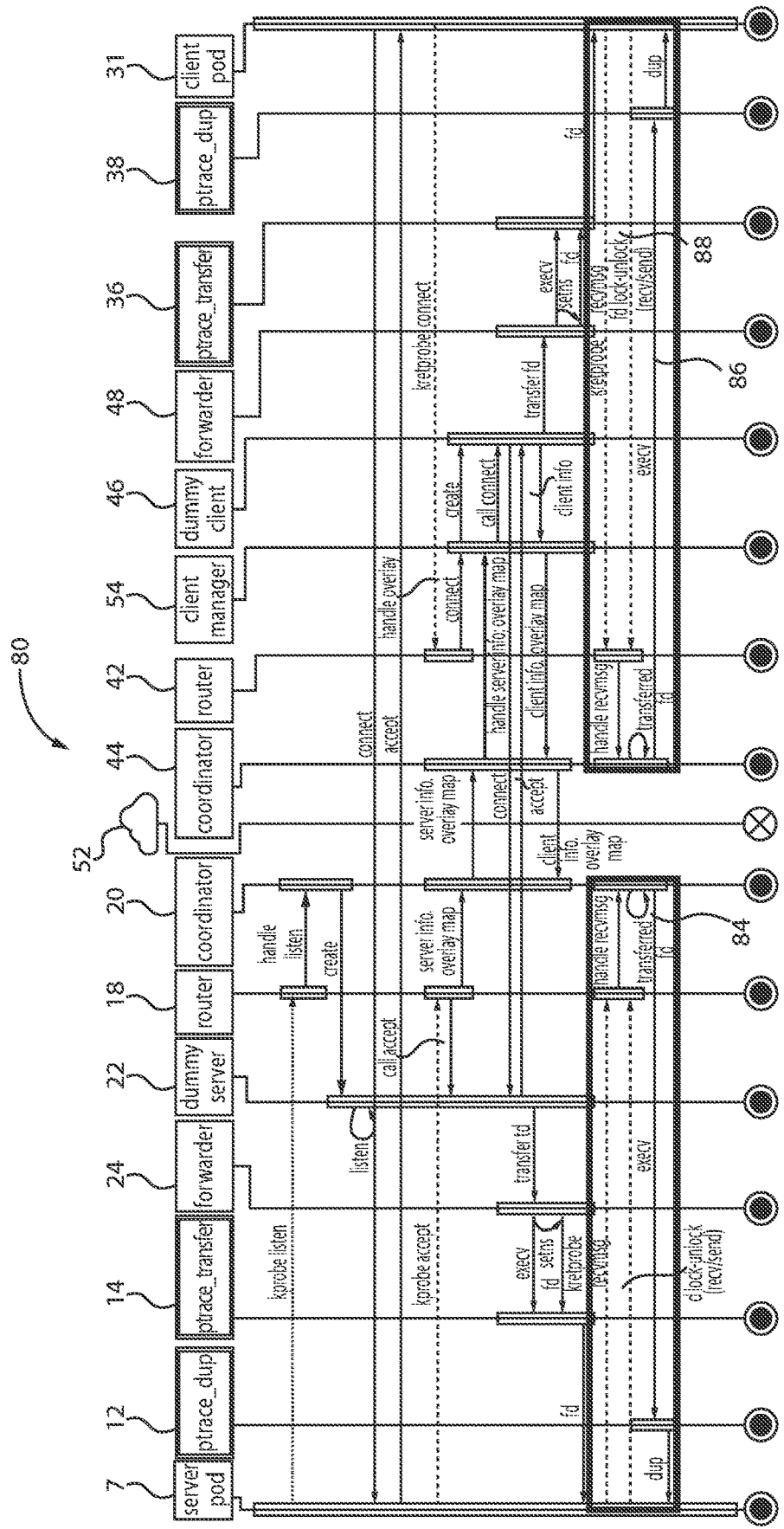
FIG. 5 illustrates communications involving finding out mapping of the transferred file descriptor and original overlay file descriptor, in accordance with an embodiment of the present invention.

FIG. 5 illustrates communications 80 involving finding out mapping of the transferred file descriptor and original overlay file descriptor, in accordance with an embodiment of the present invention.

After the mirror connection is transferred to the overlay process, the exemplary methods use the BCC toolkit for polling the recvmsg system call from the kernel in real-time to confirm that the transferred file descriptor is ready at the overlay process. The exemplary methods then find matching transferred file descriptor (fd) and original overlay fd previously collected. If the process isn't locked by the send/recv process traced by BCC, the exemplary method calls ptrace_dup, which applies ptrace_do to the inject dup2 call in place of the overlay process to duplicate the transferred fd to the original fd.

FIG. 6 is a block/flow diagram of an exemplary eBPF, which is an extended use case of the Berkeley Packet Filter (BPF), in accordance with an embodiment of the present invention.

The eBPF 90 includes a user space 91 and a kernel space 92. As noted above, Linux divides its memory into two distinct areas, that is, kernel space 92 and user space 91. The user space 91 communicates with the kernel space 92 via system calls 102. The user space 91 can include a router 94 that communicates with the verifier 96 in the kernel space 96 via an eBPF library (BCC) 108. The kernel 92 expects all eBPF programs to be loaded as bytecode, so a way to create the bytecode using higher-level languages is needed. The most popular toolchain for writing and debugging eBPF programs is called BPF Compiler Collection (BCC). The user space 91 includes processes 104 in a namespace.

Before the eBPF maps 106 can be loaded to the kernel space 92, they need to be verified by the verifier 96. Thus, all eBPF programs need to be verified by the verifier 96. eBPF maps 106 allow eBPF programs to keep state between invocations and to share data with the user-space applications. An eBPF map 106 is basically a key-value store, where values are generally treated as binary blobs of arbitrary data. eBPF maps 106 are created using the 'bpf_cmd' syscall with BPF_MAP_CREATE parameter and, as everything else in Linux, they are addressed via a file descriptor.

The kernel space 92 also includes a Just-In-Time (JIT) compiler 98. After verification, eBPF bytecode is just-in-time (JIT) compiled into native machine code. eBPF has a modern design, meaning it has been upgraded to be 64-bit encoded with 11 total registers. This closely maps eBPF to hardware for x86_64, ARM, and arm64 architecture, amongst others. Fast compilation at runtime makes it possible for eBPF to remain performant even as it must first pass through a VM.

The kernel space 92 further includes sockets 100. Sockets 100 are used for client and server interaction. Clients connect to the server, exchange information, and then disconnect. The socket on the server process waits for request from the client. This process will be described below with reference to FIGS. 7 and 8.

Thus, eBPF works by compiling eBPF programs into bytecode, verifying programs executed safely in a VM before being loaded at the hook point, attaching programs to hook points within the kernel that are triggered by specified events, compiling at runtime for maximum efficiency, calling helper functions to manipulate data when a program is triggered, and using maps (key-value pairs) to share data between the user space and kernel space and for keeping state.

Figure 7:
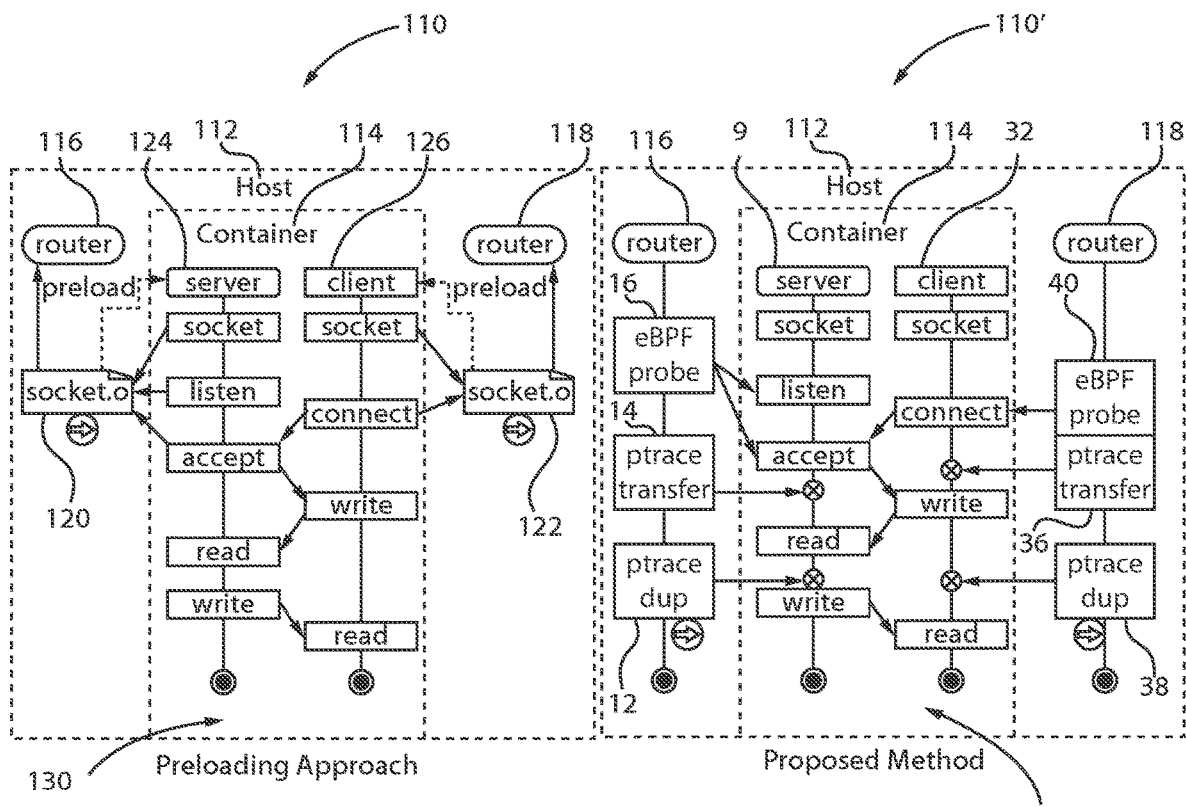
FIG. 7 is a block/flow diagram of a comparison between a pre-loading approach and the exemplary socket transferring technique, in accordance with an embodiment of the present invention.

FIG. 7 is a block/flow diagram of a comparison between a pre-loading approach and the exemplary socket transferring technique, in accordance with an embodiment of the present invention.

The conventional approach 110 includes a host 112 with a container 114 therein. The container 114 has a server 124 and a client 126. The server 124 and client 126 communicate with each other via mechanism 130. The server 124 can have a server router 116 with socket 120 and the client 126 can have a client router 118 with socket 122. The mechanism 130 illustrates several communications via listen, accept, connect, read, and write events.

The approach 110' of the exemplary embodiments includes a host 112 with a container 114 therein. The container 114 has a server 9 and a client 32. The server 9 and client 32 communicate with each other via mechanism 130'. The server 9 can have a server router 116 and the client 32 can have a client router 118. The mechanism 130' illustrates several communications via listen, accept, connect, read, and write events. However, in contrast to the approach 110, in the exemplary embodiments, the server router 116 includes an eBPF probe 16, a ptrace 10 with ptrace transfer parameters 14 and ptrace duplicate parameters 12. Similarly, the client router 118 includes an eBPF probe 40, a ptrace 34 with ptrace transfer parameters 36 and ptrace duplicate parameters 38.

Therefore, in contrast to approach 110, the exemplary methods probe connection-relevant system call events using eBPF routers 16, 40 for collection and filtering, and are handled by respective coordinators 20, 44. The exemplary methods then create a mirror call at the host namespace with dummy server/client 22, 46 by creating the dummy server 22, sending the server host address mapping to overlay the address to the coordinator 44 of client host 30, creating and connecting the dummy client 46, and returning the client host address to the server coordinator 44. The exemplary methods further transfer the mirror connection the overlay process via the forwarder 24 by temporary namespace entering and injecting the system call. Finally, the exemplary embodiments probe transfer the call event to map the overlay socket with a transferred dummy socket and activate duplication when the overlay socket is not locked.

Figure 8:
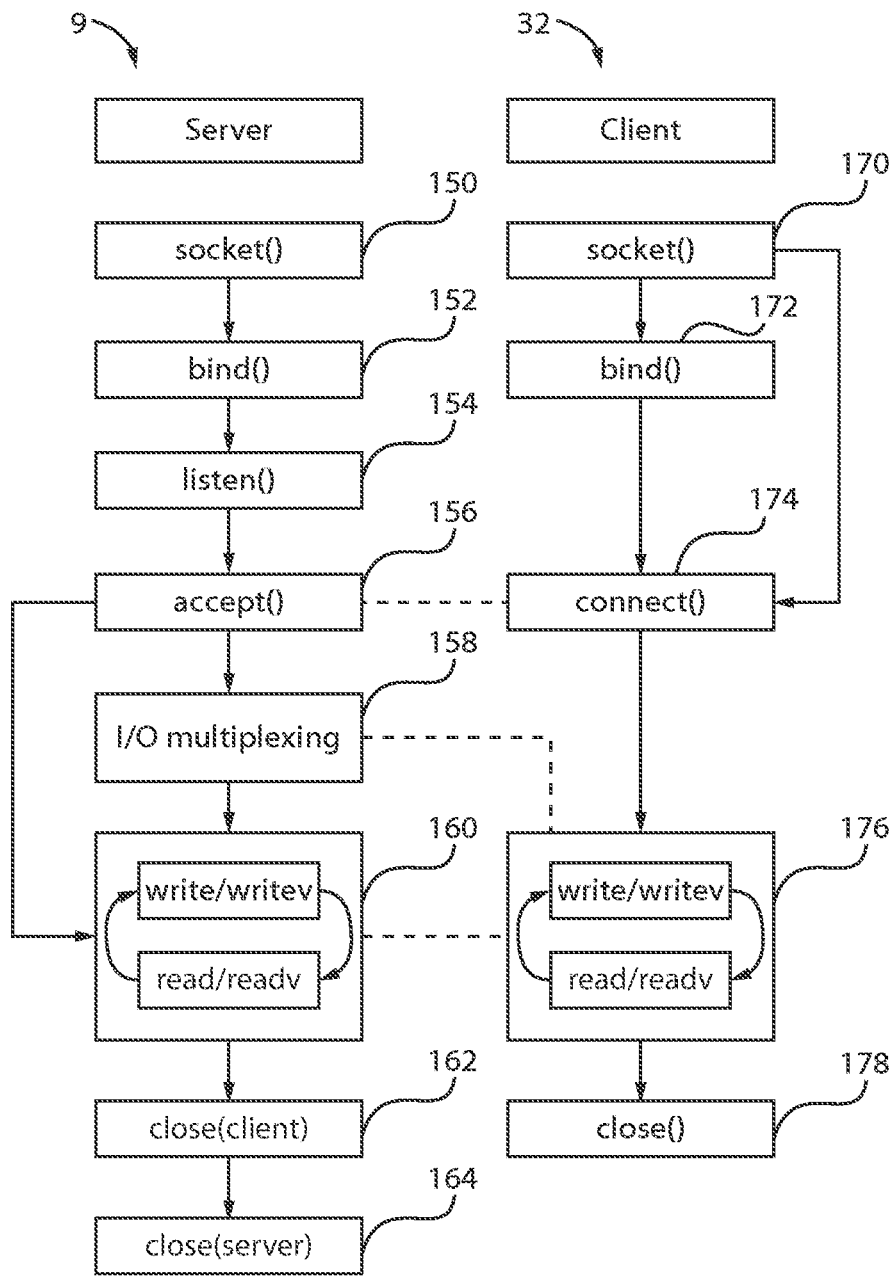
FIG. 8 is a block/flow diagram of socket calls between the server and the client, in accordance with an embodiment of the present invention.

FIG. 8 is a block/flow diagram of socket calls between the server and the client, in accordance with an embodiment of the present invention.

The server 9 includes a socket( ) API 150, a bind( ) API 152, a listen( ) API 154, an accept( ) API 156, an I/O multiplexing component 158, a read/write API 160, and close( ) APIs 162, 164. Close( ) API 162 is close(client) and close( ) API 164 is close(server). The server 9 communicates with the client 32. The client 32 includes a socket( ) API 170, a bind( ) API 172, a connect( ) API 174, as well as a read/write API 176 and a close( ) API 178.

The socket( ) API creates an endpoint for communications and returns a socket descriptor that represents the endpoint.

When an application has a socket descriptor, it can bind a unique name to the socket.

Servers must bind a name to be accessible from the network.

The listen( ) API indicates a willingness to accept client connection requests. When a listen( ) API is issued for a socket, that socket cannot actively initiate connection requests.

The listen( ) API is issued after a socket is allocated with a socket( ) API and the bind( ) API binds a name to the socket. A listen( ) API must be issued before an accept( ) API is issued.

The client application uses a connect( ) API on a stream socket to establish a connection to the server.

The server application uses the accept( ) API to accept a client connection request. The server must issue the bind( ) and listen( ) APIs successfully before it can issue an accept( ) API.

When a connection is established between sockets 150, 170 (between client and server), a user can employ any of the socket API data transfer APIs. Clients and servers have many data transfer APIs from which to choose, such as send( ), recv( ), read( ), write( ), and others, as noted above.

When a server 9 or client 32 wants to stop operations, it issues a close( ) API 16, 164, 178 to release any system resources acquired by the socket.

Figure 9:
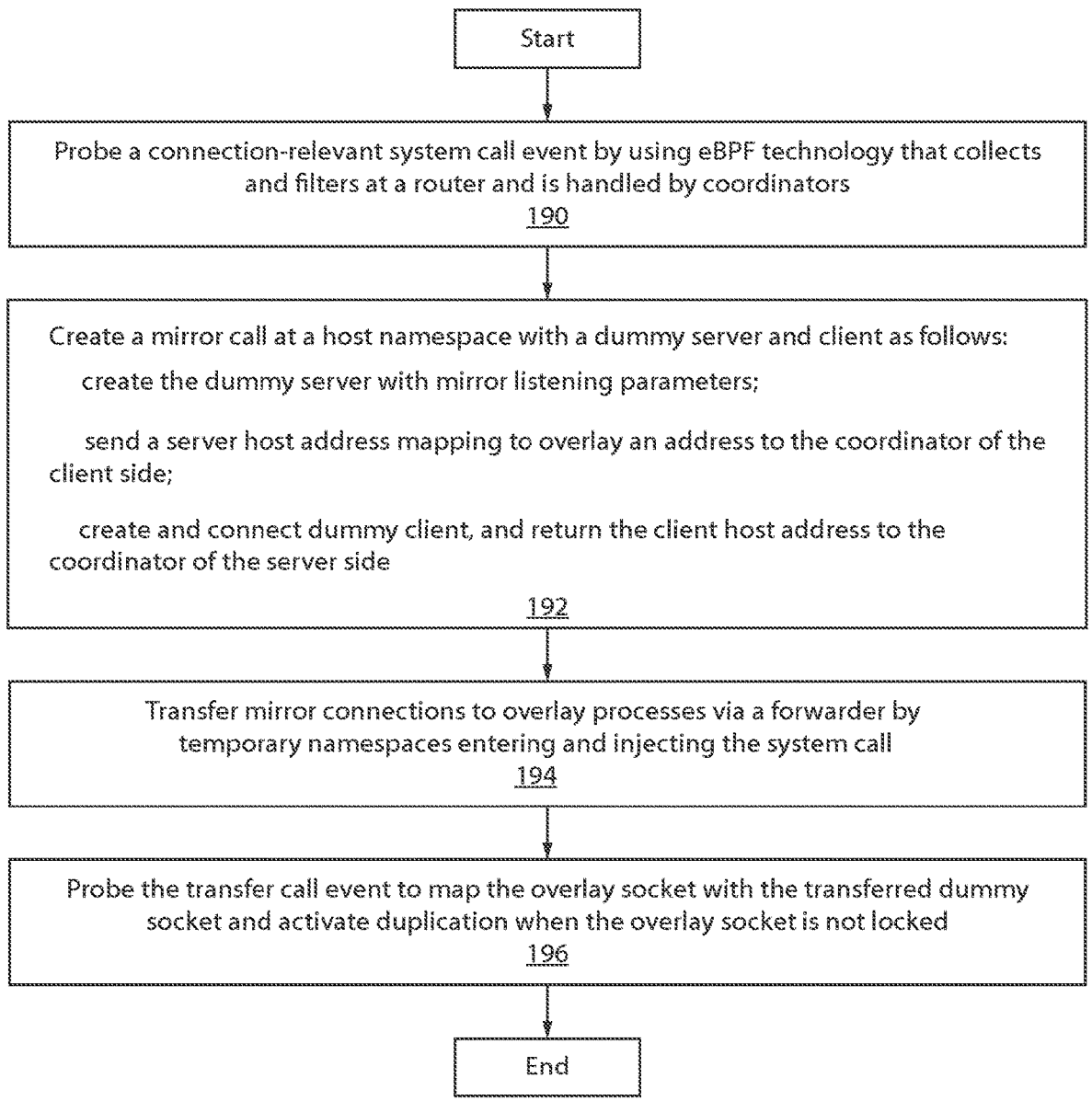
FIG. 9 is a block/flow diagram of an exemplary method for employing a socket transferring technique, in accordance with an embodiment of the present invention.

FIG. 9 is a block/flow diagram of an exemplary method for employing a socket transferring technique, in accordance with an embodiment of the present invention.

At block 190, probe a connection-relevant system call event by using eBPF technology that collects and filters at a router and is handled by coordinators.

At block 192, create a mirror call at a host namespace with a dummy server and client as follows: create the dummy server with mirror listening parameters, send a server host address mapping to overlay an address to the coordinator of the client side, and create and connect the dummy client and return the client host address to the coordinator of the server side.

At block 194, transfer mirror connections to overlay processes via a forwarder by temporary namespaces entering and injecting the system call.

At block 196, probe the transfer call event to map the overlay socket with the transferred dummy socket and activate duplication when the overlay socket is not locked.

Figure 10:
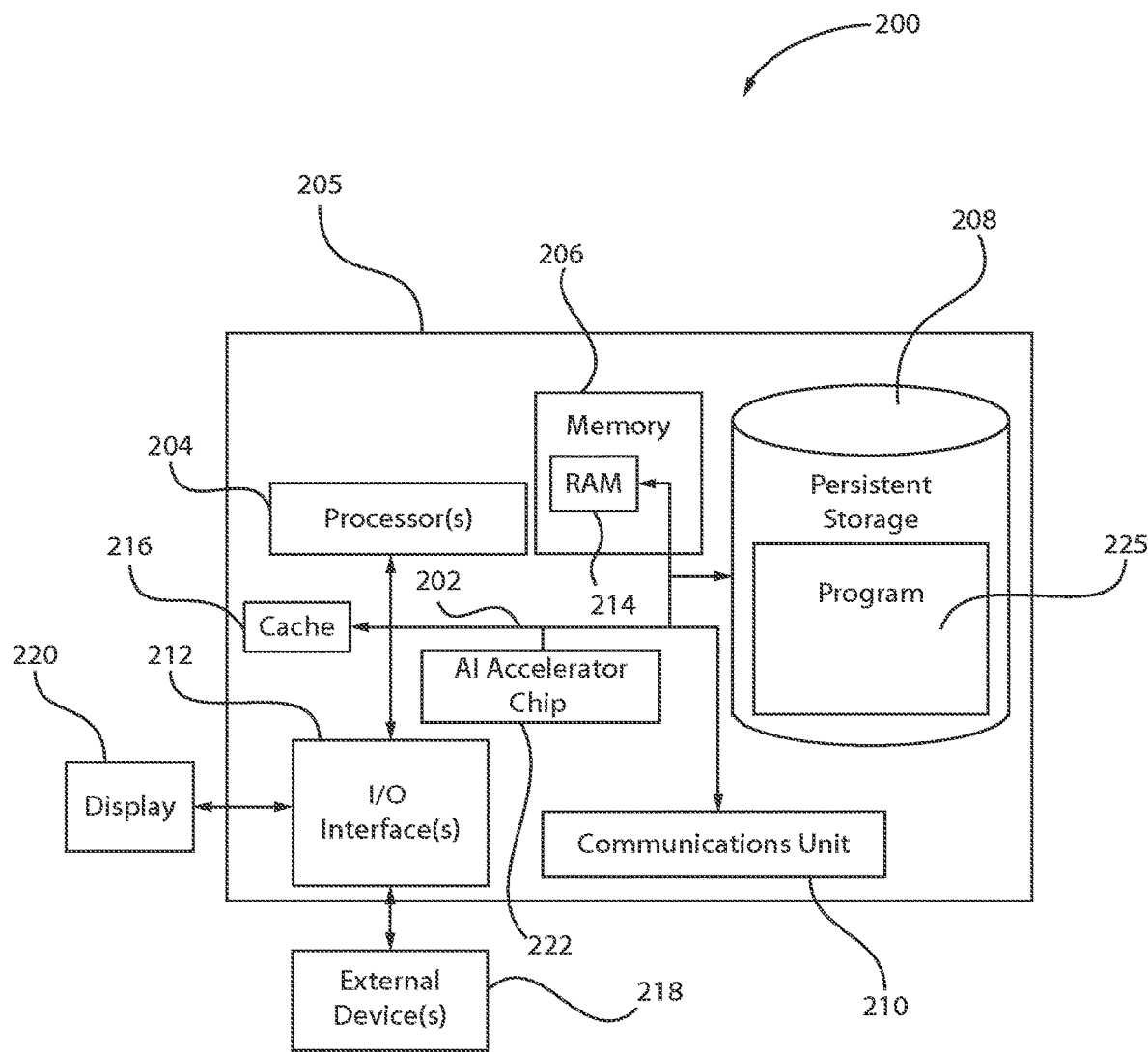
FIG. 10 is a block/flow diagram of an exemplary processing system for employing a socket transferring technique, in accordance with an embodiment of the present invention.

FIG. 10 is a block/flow diagram of an exemplary processing system for employing a socket transferring technique, in accordance with an embodiment of the present invention.

FIG. 10 depicts a block diagram of components of system 200, which includes computing device 205. It should be appreciated that FIG. 10 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 (to implement socket transferring techniques using eBPF) in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 11:
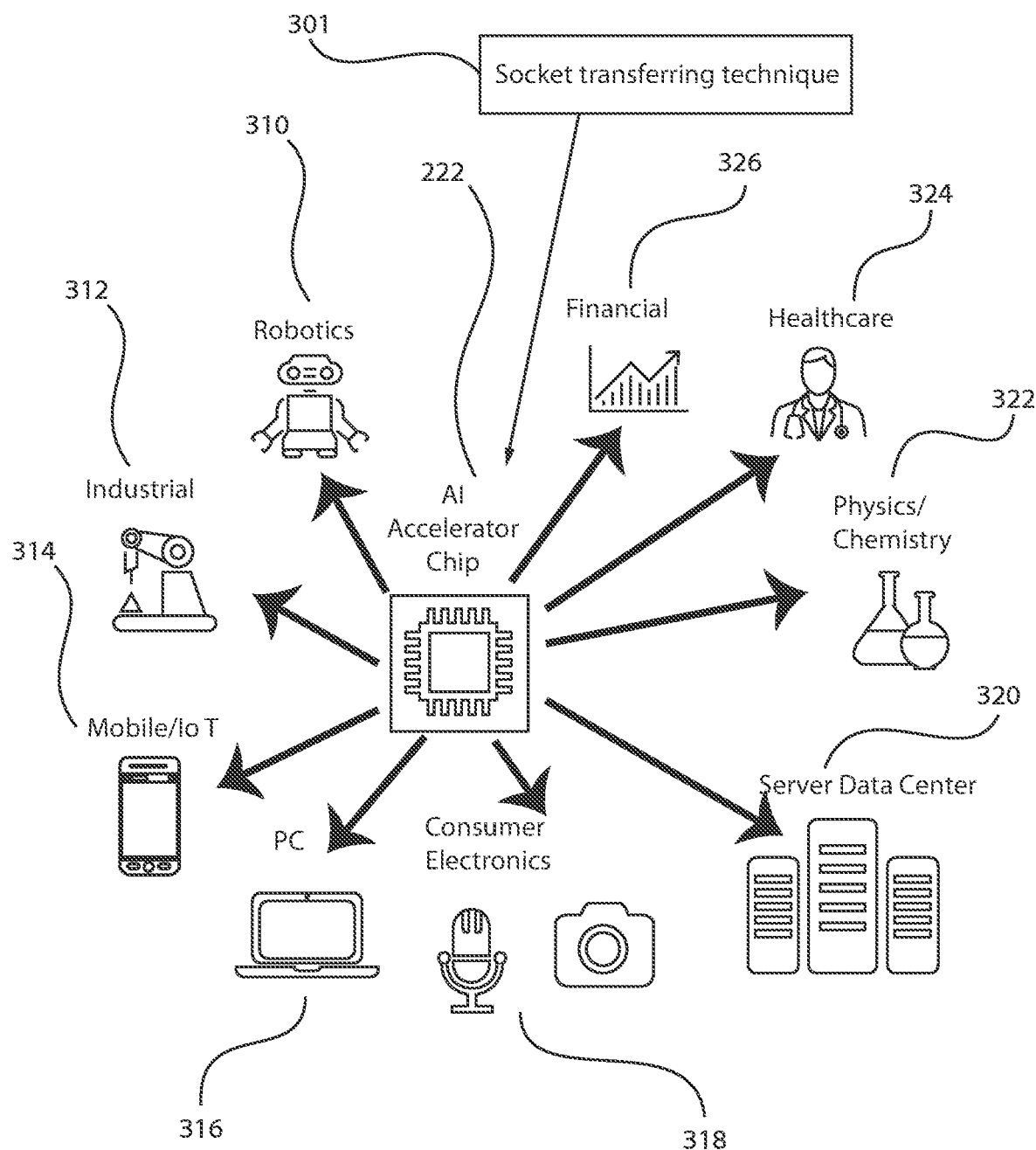
FIG. 11 illustrates practical applications for employing a socket transferring technique via an artificial intelligence (AI) accelerator chip, in accordance with an embodiment of the present invention.

FIG. 11 illustrates practical applications for employing a socket transferring technique via an artificial intelligence (AI) accelerator chip, in accordance with an embodiment of the present invention.

The artificial intelligence (AI) accelerator chip 222 can implement the socket transferring technique 301, and can be used in a wide variety of practical applications, including, but not limited to, robotics 310, industrial applications 312, mobile or Internet-of-Things (IoT) 314, personal computing 316, consumer electronics 318, server data centers 320, physics and chemistry applications 322, healthcare applications 324, and financial applications 326.

For example, Robotic Process Automation or RPA 310 enables organizations to automate tasks, streamline processes, increase employee productivity, and ultimately deliver satisfying customer experiences. Through the use of RPA 310, a robot can perform high volume repetitive tasks, freeing the company's resources to work on higher value activities. An RPA Robot 310 emulates a person executing manual repetitive tasks, making decisions based on a defined set of rules, and integrating with existing applications. All of this while maintaining compliance, reducing errors, and improving customer experience and employee engagement.

Figure 12:
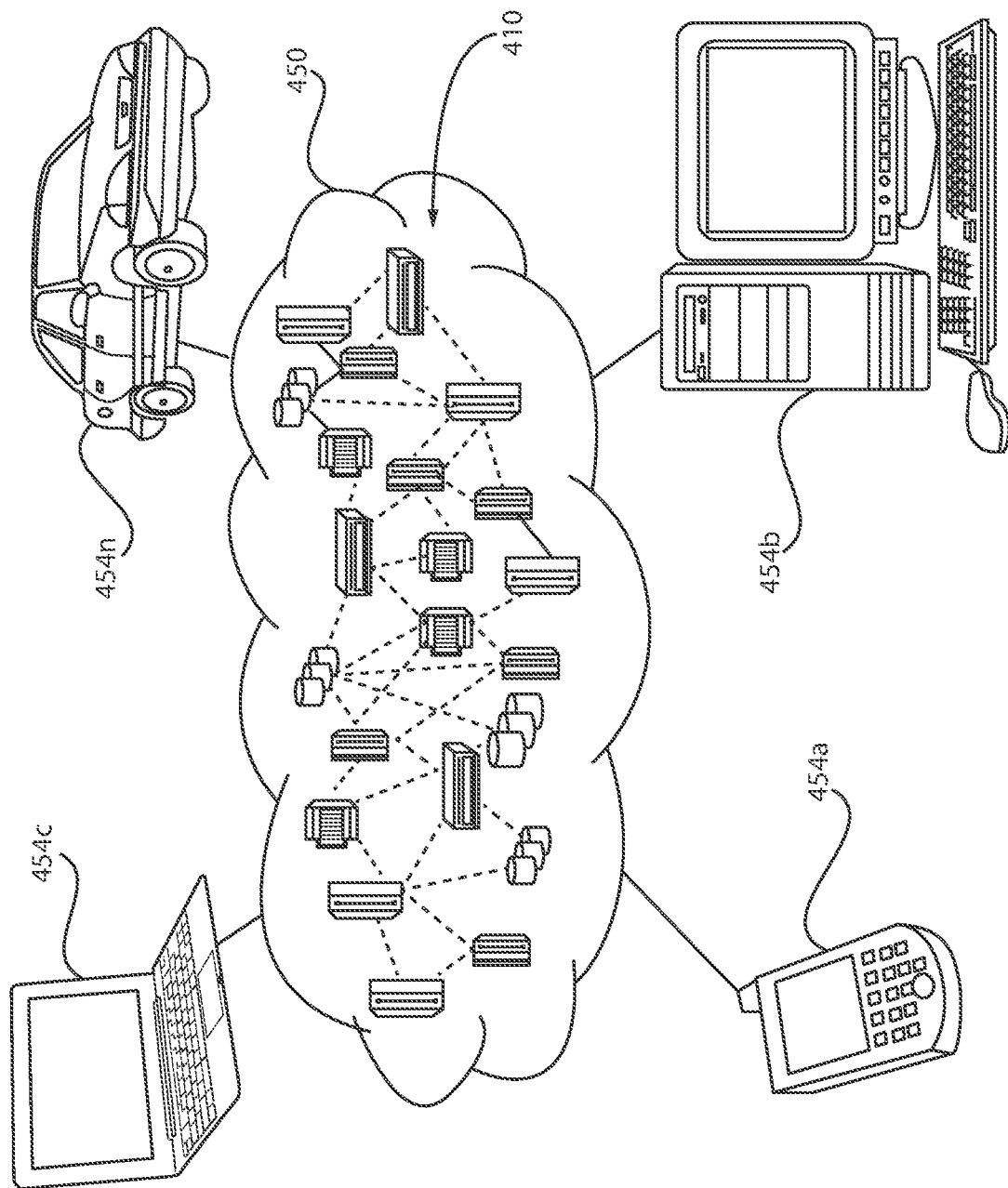
FIG. 12 is a block/flow diagram of an exemplary cloud computing environment, in accordance with an embodiment of the present invention.

FIG. 12 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 12, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 12 are intended to be illustrative only and that computing nodes 410 and cloud computing environment 450 can communicate with any type of computerized device over any type of network and/or network addressable connection (e.g., using a web browser).

Figure 13:
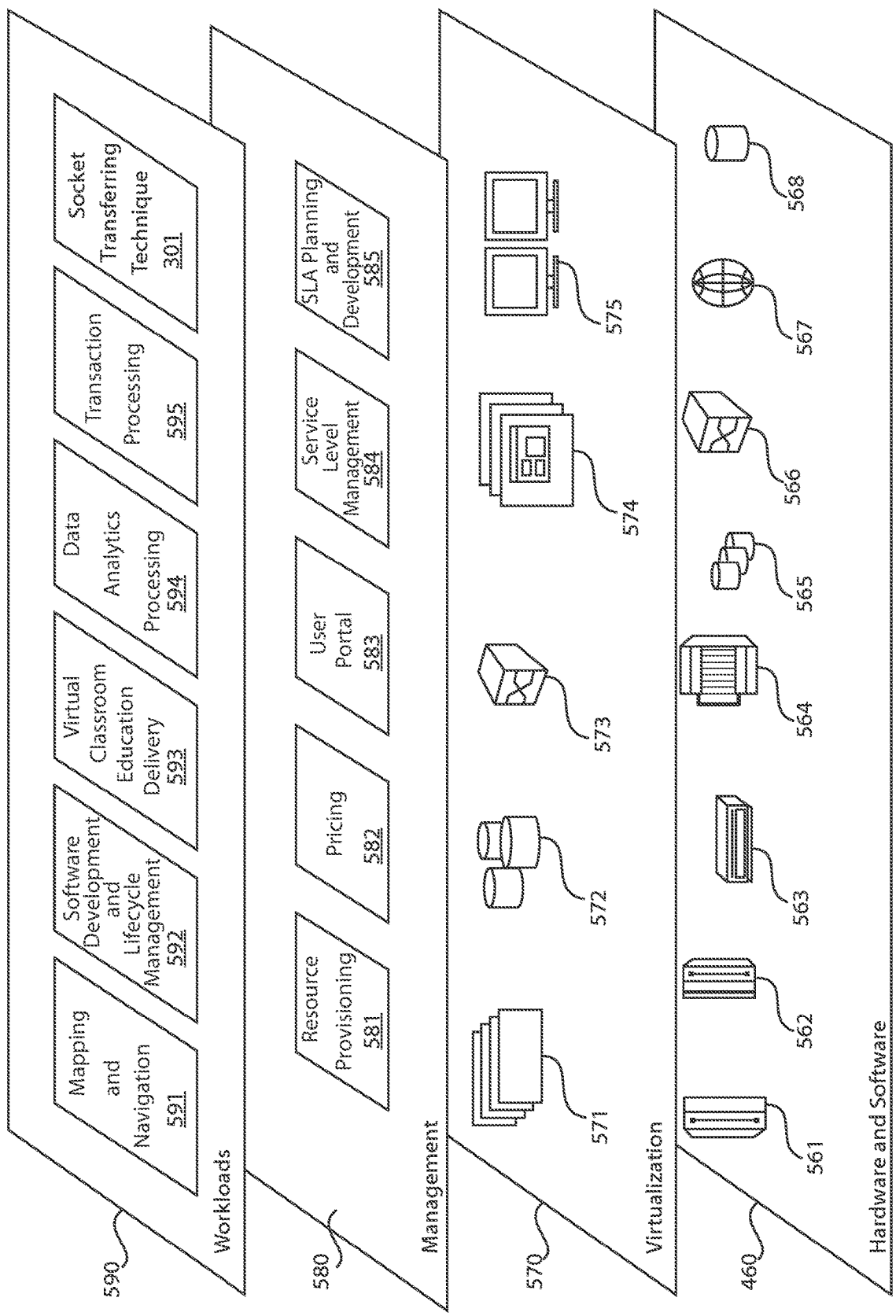
FIG. 13 is a schematic diagram of exemplary abstraction model layers, in accordance with an embodiment of the present invention.

FIG. 13 is a schematic diagram of exemplary abstraction model layers, in accordance with an embodiment of the present invention. It should be understood in advance that the components, layers, and functions shown in FIG. 13 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators.

Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and socket transferring technique 301.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for socket transferring for high performance computing networks by using kernel tracing (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for building socket transferring between containers in cloud-native environments by using kernel tracing techniques, the method comprising:
    probing a connection-relevant system call event by using an extended Berkeley Packet Filter (eBPF) to collect and filter data at a router and handled by server and client coordinators;
    creating a mirror call at a host namespace with a dummy server and dummy client by:
        creating the dummy server with mirror listening parameters;
        sending a server host address mapping to overlay the server host address to the client coordinator in an overlay process; and
        creating and connecting the dummy client to return a client host address to the server coordinator;
    transferring mirror connections to the overlay process via a forwarder by temporary namespaces entering and injecting socket system calls; and
    probing a transfer call event to map an overlay socket with a transferred dummy socket to activate duplication when the overlay socket is not locked.

2. The computer-implemented method of claim 1, wherein the eBPF passively polls and filters the socket system calls in the overlay process.

3. The computer-implemented method of claim 1, wherein a file description call is injected into the overlay process.

4. The computer-implemented method of claim 3, wherein a middle process is employed to move between child and parent namespaces to transfer a parent socket connection.

5. The computer-implemented method of claim 1, wherein a BPF Compiler Collection (BCC) toolkit is employed for polling listen, accept, and connect system calls from a kernel in real-time to the router.

6. The computer-implemented method of claim 5, wherein the listen system call creates the dummy server.

7. The computer-implemented method of claim 5, wherein the accept system call accepts new connections and cooperates with accepted clients via the server and client coordinators.

8. The computer-implemented method of claim 5, wherein the connect system call makes a connection to a host layer once it receives information from a server.

9. The computer-implemented method of claim 1, wherein, once host connection is established between the dummy client and client server, a file descriptor is transferred to the forwarder via a Unix socket in a host namespace.

10. The computer-implemented method of claim 9, wherein the forwarder temporarily moves a mount namespace to the overlay process by a setns system call.

11. The computer-implemented method of claim 10, wherein a BCC toolkit for polling a recvmsg system call from the kernel in real-time is employed to confirm that the transferred file descriptor is ready at the overlay process.

12. A computer program product for building socket transferring between containers in cloud-native environments by using kernel tracing techniques, the computer program product comprising a computer readable storage medium having program instructions embodied therewith, the program instructions executable by a computer to cause the computer to:
    probe a connection-relevant system call event by using an extended Berkeley Packet Filter (eBPF) to collect and filter data at a router and handled by server and client coordinators;
    create a mirror call at a host namespace with a dummy server and dummy client by:
        creating the dummy server with mirror listening parameters;
        sending a server host address mapping to overlay the server host address to the client coordinator in an overlay process; and
        creating and connecting the dummy client to return a client host address to the server coordinator;
    transfer mirror connections to the overlay process via a forwarder by temporary namespaces entering and injecting socket system calls; and
    probe a transfer call event to map an overlay socket with a transferred dummy socket to activate duplication when the overlay socket is not locked.

13. The computer program product of claim 12, wherein the eBPF passively polls and filters the socket system calls in the overlay process.

14. The computer program product of claim 12, wherein a file description call is injected into the overlay process.

15. The computer program product of claim 14, wherein a middle process is employed to move between child and parent namespaces to transfer a parent socket connection.

16. The computer program product of claim 12, wherein a BPF Compiler Collection (BCC) toolkit is employed for polling listen, accept, and connect system calls from a kernel in real-time to the router.

17. The computer program product of claim 16, wherein the listen system call creates the dummy server.

18. The computer program product of claim 16, wherein the accept system call accepts new connections and cooperates with accepted clients via the server and client coordinators.

19. The computer program product of claim 16, wherein the connect system call makes a connection to a host layer once it receives information from a server.

20. The computer program product of claim 12, wherein, once host connection is established between the dummy client and client server, a file descriptor is transferred to the forwarder via a Unix socket in a host namespace.

21. The computer program product of claim 20, wherein the forwarder temporarily moves a mount namespace to the overlay process by a setns system call.

22. The computer program product of claim 21, wherein a BCC toolkit for polling a recvmsg system call from the kernel in real-time is employed to confirm that the transferred file descriptor is ready at the overlay process.

23. A system for building socket transferring between containers in cloud-native environments by using kernel tracing techniques, the system comprising:
  memory;
  one or more processors;
  a server pod implementing a server process; and
  a client pod implementing a client process, wherein system calls are transmitted from the server pod to the client pod to:
    probe a connection-relevant system call event by using an extended Berkeley Packet Filter (eBPF) to collect and filter data at a router and handled by server and client coordinators;
    create a mirror call at a host namespace with a dummy server and dummy client by:
      creating the dummy server with mirror listening parameters;
      sending a server host address mapping to overlay the server host address to the client coordinator in an overlay process; and
      creating and connecting the dummy client to return a client host address to the server coordinator;
    transfer mirror connections to the overlay process via a forwarder by temporary namespaces entering and injecting socket system calls; and
    probe a transfer call event to map an overlay socket with a transferred dummy socket to activate duplication when the overlay socket is not locked.

24. A computer-implemented method for building socket transferring between containers in cloud-native environments by using kernel tracing techniques, the method comprising:
  probing a connection-relevant system call event by employing an extended Berkeley Packet Filter (eBPF) using a BPF Compiler Collection (BCC) toolkit for polling listen, accept, and connect system calls from a kernel in real-time to a router;
  creating a mirror call at a host namespace with a dummy server and a dummy client;
  transferring mirror connections to an overlay process via a forwarder by:
    transferring a file descriptor to the forwarder via a Unix socket in the host namespace;
    temporarily moving a mount namespace, via the forwarder, to the overlay process;
    injecting a recvmsg system call in place of the overlay process; and
    sending the file descriptor via the Unix socket to a listening overlay process; and
  probing a transfer call event to map an overlay socket with a transferred dummy socket to activate duplication when the overlay socket is not locked.

25. A computer program product for building socket transferring between containers in cloud-native environments by using kernel tracing techniques, the computer program product comprising a computer readable storage medium having program instructions embodied therewith, the program instructions executable by a computer to cause the computer to:
  probe a connection-relevant system call event by employing an extended Berkeley Packet Filter (eBPF) using a BPF Compiler Collection (BCC) toolkit for polling listen, accept, and connect system calls from a kernel in real-time to a router;
  create a mirror call at a host namespace with a dummy server and a dummy client;
  transfer mirror connections to an overlay process via a forwarder by:
    transferring a file descriptor to the forwarder via a Unix socket in the host namespace;
    temporarily moving a mount namespace, via the forwarder, to the overlay process;
    injecting a recvmsg system call in place of the overlay process; and
    sending the file descriptor via the Unix socket to a listening overlay process; and
  probe a transfer call event to map an overlay socket with a transferred dummy socket to activate duplication when the overlay socket is not locked.

* * * * *